US008619575B2

(12) United States Patent
Rahman et al.

(10) Patent No.: US 8,619,575 B2
(45) Date of Patent: Dec. 31, 2013

(54) MULTIBAND, MULTIMODE SELECTION AND SIMULTANEOUS USE

(75) Inventors: Iftekhar Rahman, Billerica, MA (US); Andrew Youtz, Rocky Hill, NJ (US); Kyriaki Konstantinou, New York, NY (US); Pingping Zong, Randolph, NJ (US); Zheng Zhao, Plainsboro, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 280 days.

(21) Appl. No.: 13/025,387

(22) Filed: Feb. 11, 2011

(65) Prior Publication Data
US 2012/0207021 A1 Aug. 16, 2012

(51) Int. Cl.
*H04L 12/26* (2006.01)
(52) U.S. Cl.
USPC ......... 370/235; 370/252; 455/435.2; 455/524

(58) Field of Classification Search
USPC .......... 370/329, 378, 235, 241; 455/524, 453, 455/432.1
See application file for complete search history.

(56) References Cited

U.S. PATENT DOCUMENTS

| | | | |
|---|---|---|---|
| 2005/0271009 A1* | 12/2005 | Shirakabe et al. | 370/329 |
| 2007/0087757 A1* | 4/2007 | Core et al. | 455/453 |
| 2010/0105378 A1* | 4/2010 | Shi et al. | 455/432.1 |
| 2012/0087362 A1* | 4/2012 | Islam et al. | 370/338 |
| 2012/0122514 A1* | 5/2012 | Cheng et al. | 455/524 |

* cited by examiner

*Primary Examiner* — Albert T Chou

(57) ABSTRACT

A method including receiving, by a multiband, multimode user device, a request pertaining to a data flow; determining a state of the multiband, multimode user device; selecting at least one of multiple channels or multiple frequency bands, and a single mode, or selecting at least one of multiple channels or multiple frequency bands, and multiple modes to satisfy the request based on the state of the multiband, multimode user device; and using the selected at least one of multiple channels or multiple frequency bands, and the single mode, or the selected at least one of multiple channels or multiple frequency bands, and the multiple modes to satisfy the request.

20 Claims, 13 Drawing Sheets

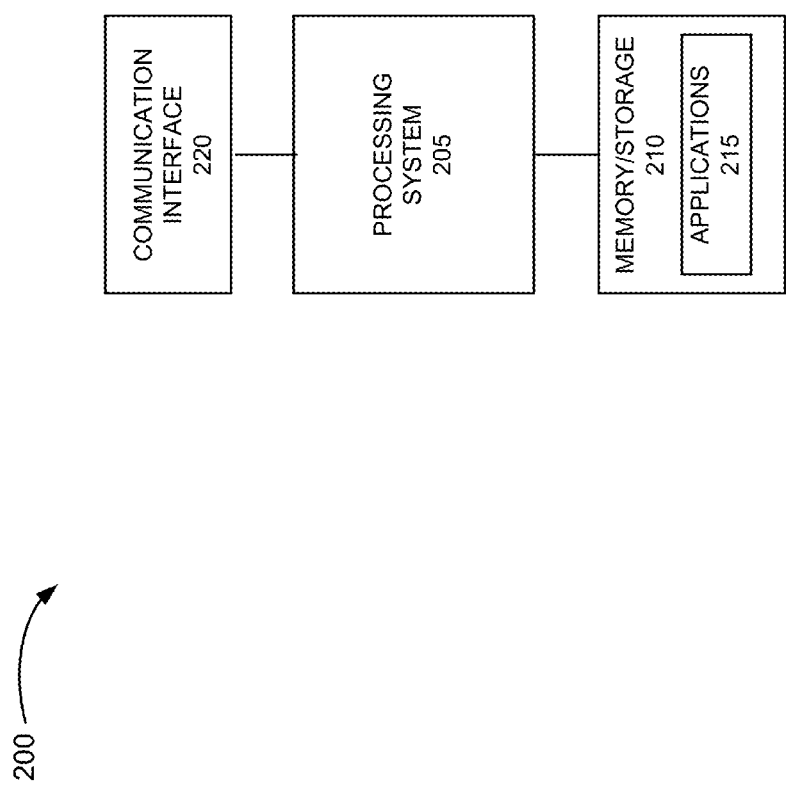

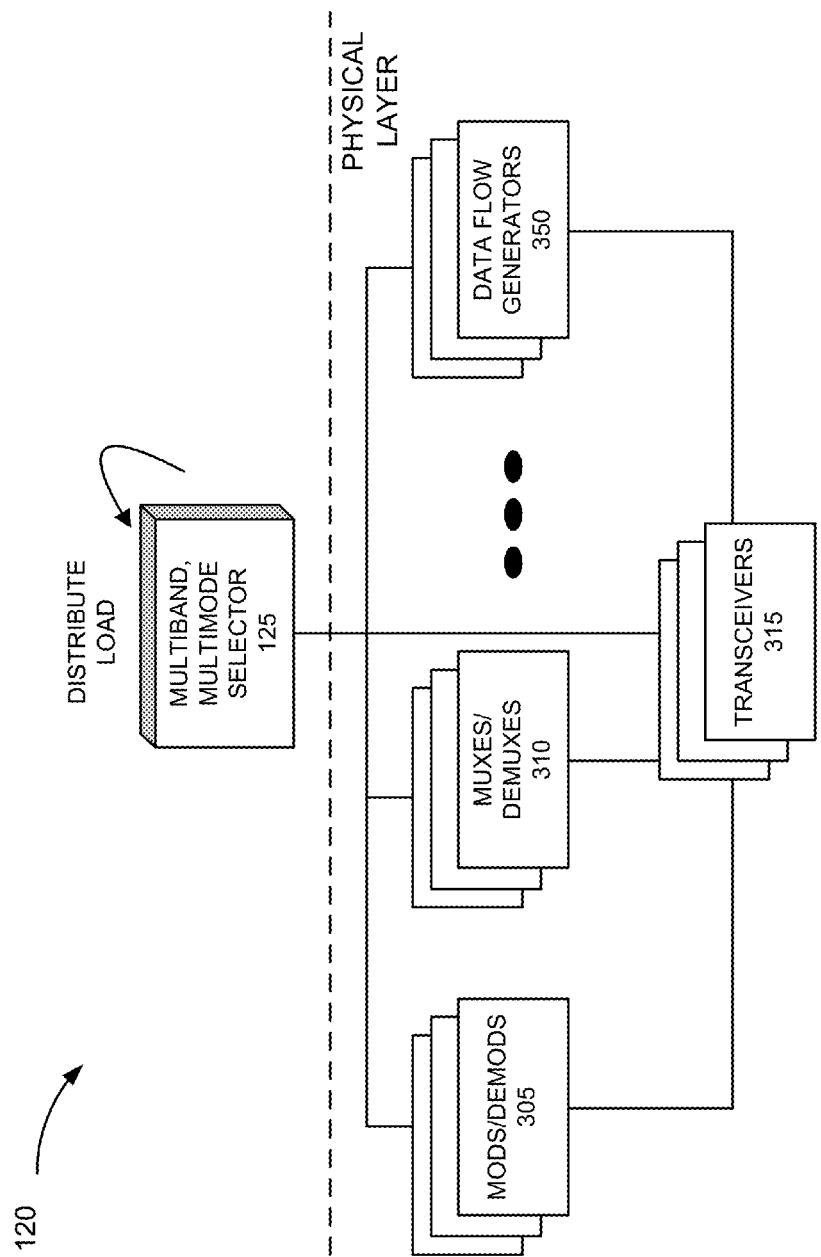

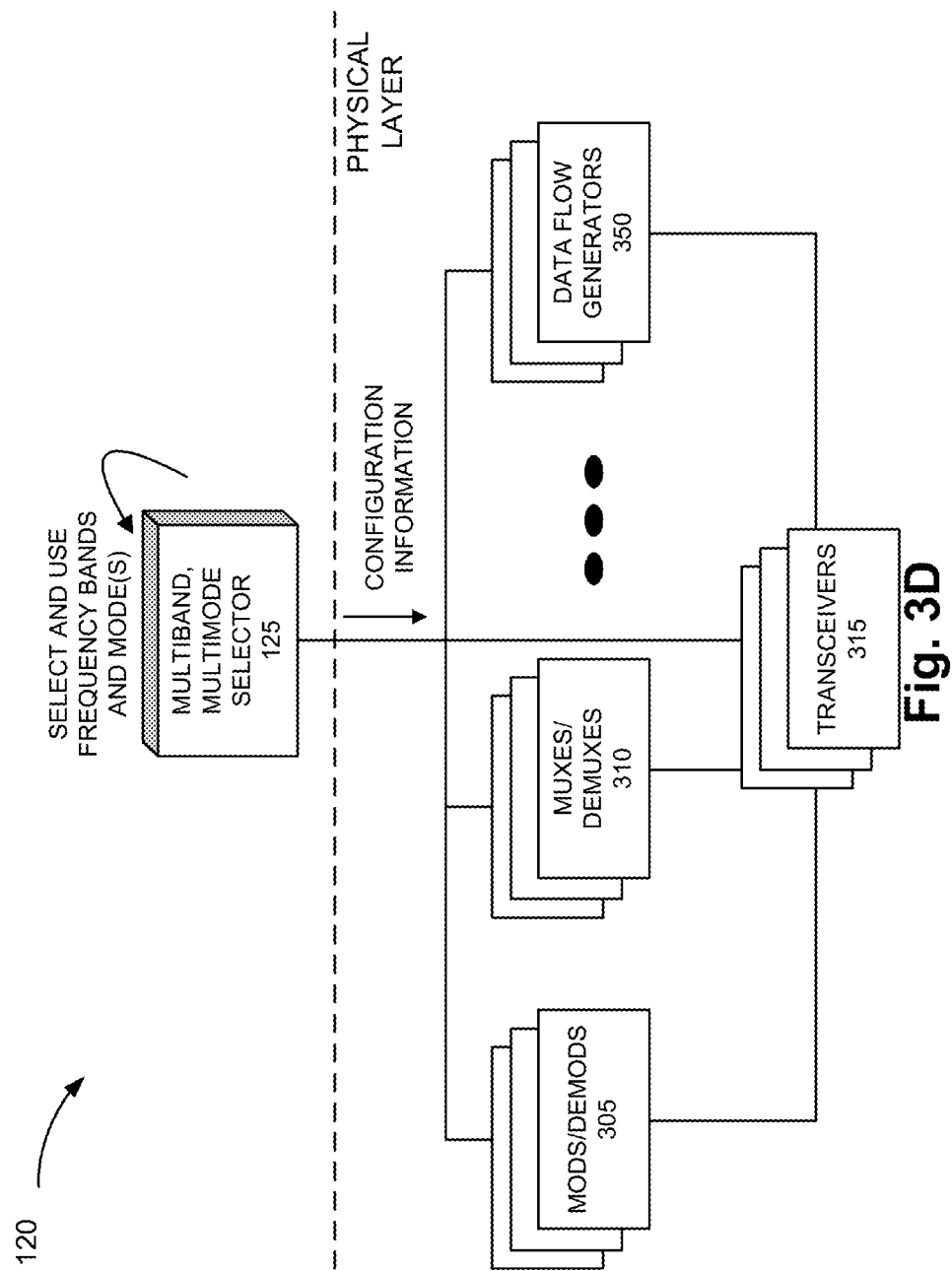

MULTIBAND, MULTIMODE SELECTION AND SIMULTANEOUS USE

BACKGROUND

As network operators and service providers strive to provide new or improved services and/or assets to users, network demands for data may correspondingly increase in a significant manner. As a result, network operators and service providers must confront a host of challenges to ensure that quality of service (QOS), including high data rates and low latency, and other performance metrics are maintained.

BRIEF DESCRIPTION OF THE DRAWINGS

FIG. 2 is a diagram illustrating exemplary components of a device that may correspond to one or more of the devices in the exemplary network;

FIGS. 3A-3D are diagrams illustrating exemplary processes performed by an exemplary embodiment of a multiband, multimode selector.

DETAILED DESCRIPTION OF PREFERRED EMBODIMENTS

Figure 1A:
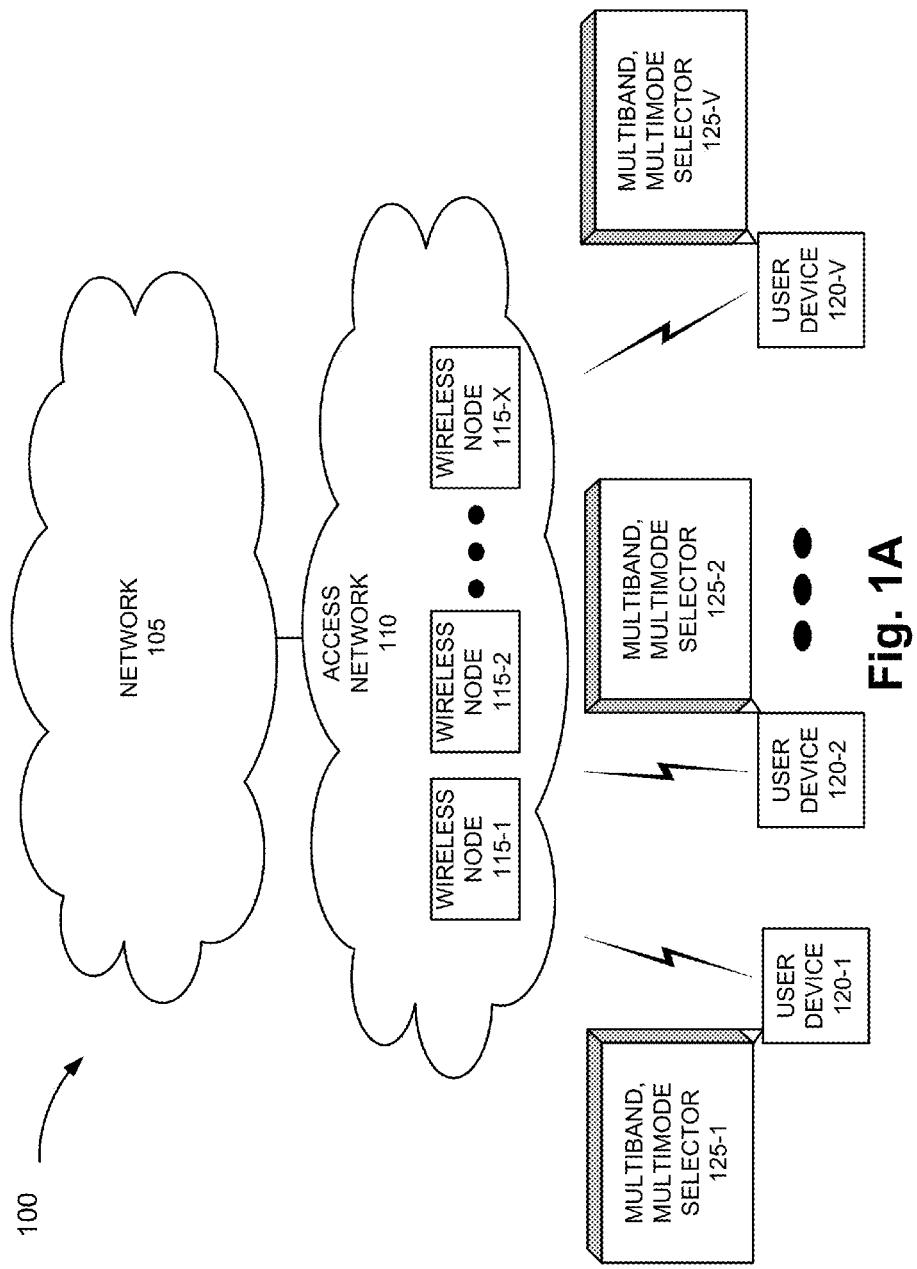
FIG. 1A is a diagram illustrating an exemplary environment in which an exemplary embodiment of multiband, multimode selection described herein may be implemented.

The following detailed description refers to the accompanying drawings. The same reference numbers in different drawings may identify the same or similar elements. Also, the following detailed description does not limit the invention.

Given the limited spectrum available in the frequency bands used for mobile wireless communication, the allocation of frequency bands, by government agencies to wireless network operators, may not be sufficient to satisfy the demands of service to users. Additionally, frequency bands licensed to wireless network operators are typically not contiguous or not substantially contiguous.

In the United States, one of the responsibilities assigned to the Federal Communications Commission (FCC) is to manage and regulate the use of radio spectrum. A wireless network operator may apply for a license, lease, sub-lease, etc., with the FCC to use particular frequencies in a particular geographic area(s). For example, for cellular service, the FCC has allocated two frequency bands, 824-849 MHz and 869-894 MHz, two frequency blocks ("A" Block and "B" Block) in which each block has a size of 25 MHz, as it pertains to geographic areas (e.g., major service areas (MSA) or regional service areas (RSAs)). Additionally, for example, for broadband radio service, the FCC has allocated the frequency band between 2496-2690 MHz, and for wireless communication service, the FCC has allocated frequency bands 2305-2320 MHz and 2345-2360 MHz, etc. The FCC may assign block(s) and geographic areas with respect to these and other types of wireless service.

Based on this framework, a wireless network operator may be granted a license, etc., to use particular frequencies in a particular geographic area as it pertains to a particular wireless service. As an example, for wireless communication service, the FCC has divided the frequency bands 2305-2320 MHz and 2345-2360 MHz into four frequency blocks (A-D), in which each block may be allocated 5 MHz or 10 MHz. In this regard, two or more wireless network operators may have a license, etc., to use one or more distinct frequency block(s) in a particular geographic area pertaining to wireless communication service. Additionally, two or more wireless network operators may share a geographical area as it pertains to other types of wireless service.

The term "multiband," as used herein, is intended to be broadly interpreted to include multiple frequency bands and/or multiple channels. By way of example, a single (frequency) band may be sub-divided into multiple channels, such as in Code Division Multiple Access (CDMA). According to other communication standards, the use of multiple channels within a single band is not present, such as in Long Term Evolution (LTE). The term "frequency band," as used herein, is intended to be broadly interpreted to include one or more frequencies (e.g., in the radio spectrum, etc.) and/or a channel. The term "frequency bands," as used herein, may include multiple frequency bands and/or multiple channels.

According to exemplary embodiments, a multiband, multimode user device may include a multiband, multimode selector. According to an exemplary embodiment, when the multiband, multimode user device receives a request (e.g., a data flow request), the multiband, multimode selector may select one or more channels (for some technologies), one or more frequency bands and one or more modes based on a demand or a load pertaining to the request. The multiband, multimode user device may use the frequency band(s) and mode(s) selected to satisfy the demand of the request. Unlike existing multiband, multimode user devices, which may select one frequency band or one mode at a time, according to an exemplary embodiment, the multiband, multimode selector may distribute the load associated with the request across multiple frequency bands and a single mode, or across multiple frequency bands and multiple modes.

As an example, assume the multiband, multimode user device receives a data flow request based on an application being used by a user. In this example, the data flow request may correspond to a request to receive a large file (e.g., having a size equal to 1 Terabyte). The multiband, multimode selector may determine the frequency band(s) and mode(s) to be used to download the file based on network resource availability and state of the multiband, multimode user device. For example, multiband, multimode selector may determine the channel(s), frequency band(s) available and resource capacity pertaining to the available frequency band(s). Additionally, the state of the multiband, multimode user device may include the connectivity state pertaining to multiple transmitters and receivers, or transceivers that may each operate with respect to one or more channel(s), frequency bands(s) and one or more mode(s). In this example, the multiband, multimode selector may select multiple channels, frequency bands and multiple modes to simultaneously accommodate the data flow request. For example, the channels, frequency bands and modes may correspond to a combination of Code Division Multiple Access (CDMA) and Long-Term Evolution (LTE) wireless communications, or some other combination of wireless communication standards.

According to an exemplary embodiment, the multiband, multimode selector may select one or more channels and one or more frequency bands associated with a particular wireless network operator. Additionally, according to an exemplary embodiment, the multiband, multimode selector may select one or more channels and one or more frequency bands associated with another wireless network operator. For example, a wireless network operator A may have an agreement (e.g., a roaming agreement, etc.) with a wireless network operator B to use one or more channels and one or more frequency bands associated with wireless network operator B.

According to an exemplary embodiment, the multiband, multimode selector may be provided with demand information pertaining to a request. For example, the demand information may include a file size, a latency, a bandwidth, a data rate, a data rate range, a bandwidth range, and/or a level of service (e.g., QoS). Based on the demand information, the multiband, multimode selector may determine and select the appropriate channel(s), frequency band(s) and mode(s) to use to satisfy the request.

The term "wireless network operator," may correspond to an entity that has a radio spectrum license, lease, sub-lease, etc., or an entity that provides wireless service. In this description, reference may be made to different wireless network operators, such as, for example, wireless network operator A and wireless network operator B. In some cases, wireless network operator A and wireless network operator B may be different entities, such as, for example, Verizon and AT&T. In other cases, wireless network operator A and wireless network operator B may correspond to the same entity. For example, wireless network operator A and wireless network operator B may correspond to the same entity that provides wireless service according to different wireless communication standards or technologies (e.g., CDMA, LTE, etc).

The term "network," as used herein, is intended to be broadly interpreted to include, for example, a wireless network (e.g., mobile network, cellular network, non-cellular network, etc.) or a wired network. By way of example, a network may include a CDMA (e.g., CDMA-2000) network, a Global System for Mobile Communications (GSM) network, a Universal Mobile Telecommunication System (UMTS) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, an Evolution Data Optimized (EV-DO) network, an LTE network, a CDMA network, and/or another type of wireless network (e.g., an ad hoc network, a 2.X generation network, a 3.X generation network, a 4.X generation network, etc.).

FIG. 1A is a diagram illustrating an exemplary environment 100 in which an exemplary embodiment of multiband, multimode selection described herein may be implemented. As illustrated in FIG. 1A, exemplary environment 100 may include a network 105, an access network 110 that includes wireless nodes 115-1 through 115-X (referred to as wireless nodes 115 or wireless node 115), and user devices 120-1 through 120-V (referred to as user devices 120 or user device 120) that include multiband, multimode selectors 125-1 through 125-V.

The number of devices and configuration in environment 100 is exemplary and provided for simplicity. According to other embodiments, environment 100 may include additional devices, fewer devices, different devices, and/or differently arranged devices than those illustrated in FIG. 1A. Additionally, or alternatively, according to other embodiments, environment 100 may include fewer networks, additional networks, and/or differently arranged networks than those illustrated in FIG. 1A.

Also, according to other embodiments, one or more functions and/or processes described as being performed by a particular device in environment 100 may be performed by a different device or multiple devices. Additionally, or alternatively, one or more functions and/or processes described as being performed by multiple devices may be performed by different devices or a single device. Environment 100 may include wired and/or wireless connections among the devices illustrated.

Network 105 and access network 110 may include one or multiple networks of one or multiple types. Wireless node 115 may include a device that is capable of wirelessly communicating with user device 120. By way of example, wireless node 115 may correspond to a base station, a relay node, a repeater, a base station controller, a Node B, a base transceiver station, an evolved Node B (eNB), a home eNB, a home node B, a radio node, an access point, or a user equipment gateway. Wireless node 115 may support a wireless communication standard or technology, such as CDMA, LTE, GSM, CDMA, UMTS, HSPA, LTE, etc.

User device 120 may include a device having the capability to communicate with other devices, systems, networks, and/or the like. User device 120 may correspond to a portable device, a handheld device, a mobile device, a vehicle-based device, or some other type of user device. User device 120 may communicate via a wireless connection. User device 120 may be capable of multiband, multimode operation. Multiband, multimode selector 125 may select one or more channels, one or more frequency bands, and one or more modes for servicing (e.g., satisfying) a request (e.g., a data flow request, etc.). User device 120 may operate according to the channel(s), frequency band(s) and mode(s) selected by multiband, multimode selector 125. For example, selector 125 may select two channels, two frequency bands and two modes (e.g., CDMA-2000 and LTE) for transmitting data and/or receiving data. Additionally, although not illustrated, multiband, multimode selector 125 may be implemented by non-user devices (e.g., meters, sensors, etc.) for machine-to-machine communication, etc. User device 120 may be interpreted to include such devices.

Figure 1B:
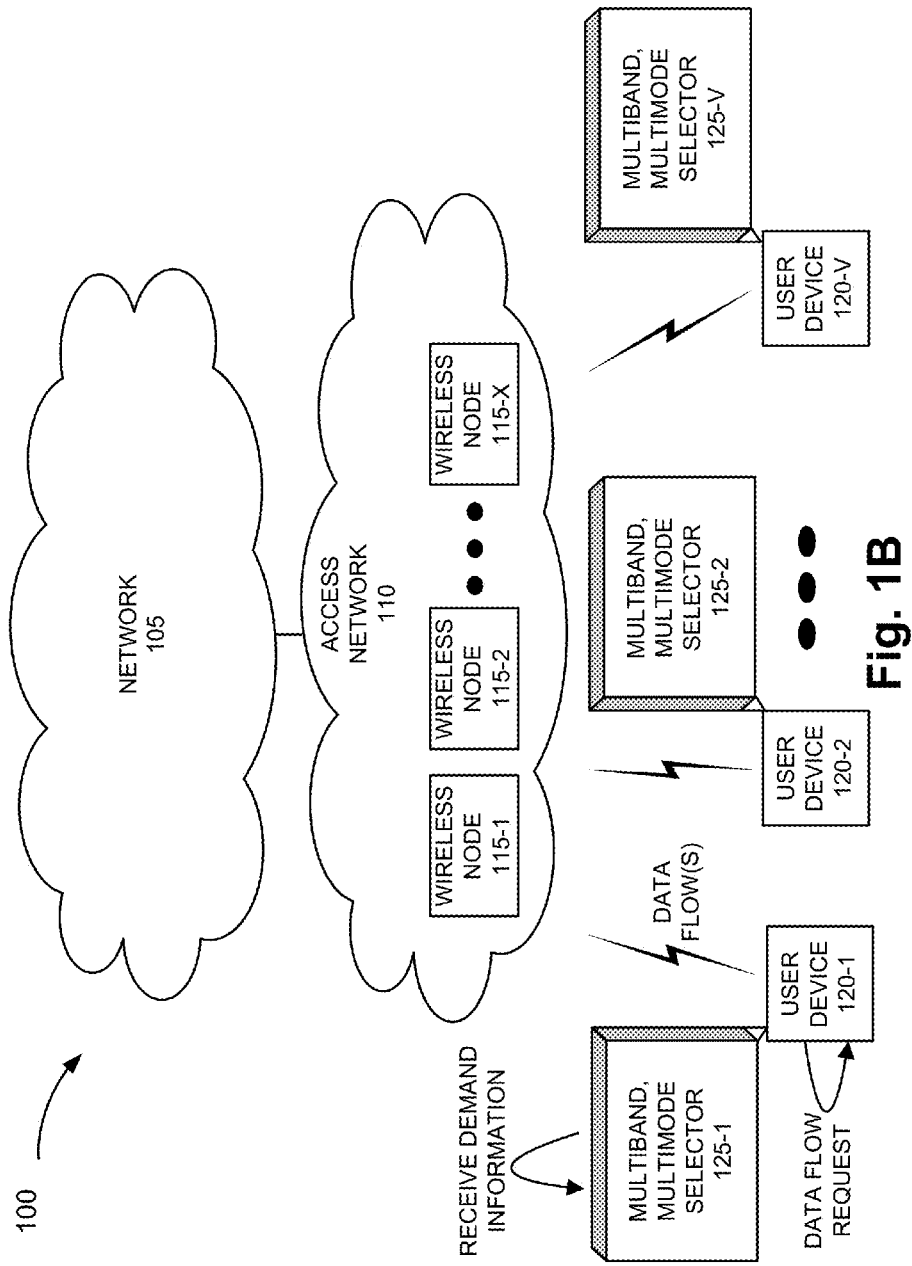
FIGS. 1B-1F are diagrams illustrating exemplary processes for providing multiband, multimode selection.

FIGS. 1B-1F are diagrams illustrating exemplary processes for providing multiband, multimode selection. Referring to FIG. 1B, assume that user device 120-1 is connected to network 105 via wireless node 115-1 of access network 110 and has established one or multiple data flow(s). Thereafter, user device 120-1 may receive a request from a user to establish another data flow. Multiband, multimode selector 125-1 may receive demand information pertaining to the request.

Figure 1C:
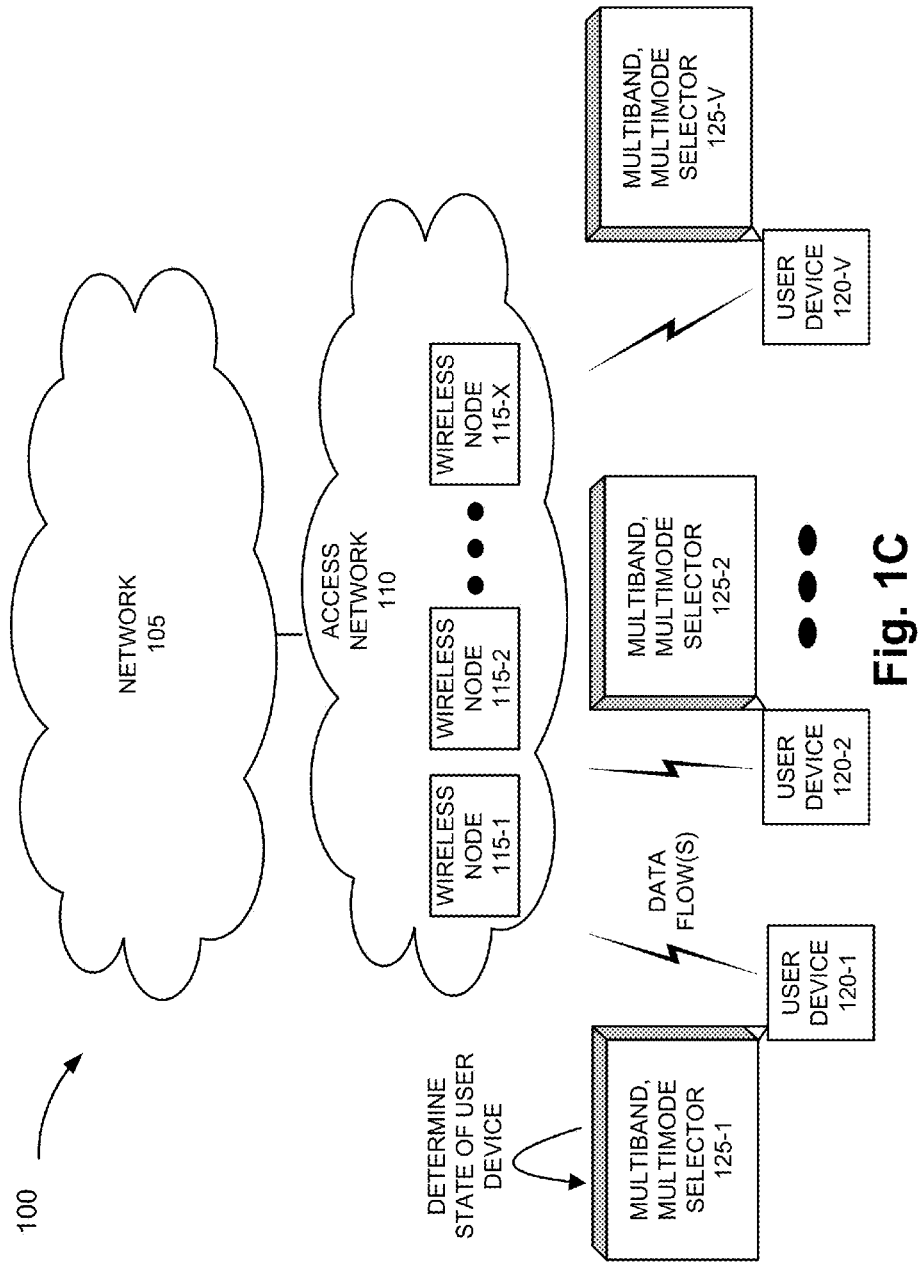

Referring to FIG. 1C, multiband, multimode selector 125-1 may determine the state of user device 125-1. For example, multiband, multimode selector 125-1 may determine the channel(s), frequency band(s) and mode(s) being used by user device 120-1 (e.g., used by transmitters and receivers or transceivers of user device 120-1). Multiband, multimode selector 125-1 may determine the capacity available with respect to the transmitters and receivers, or transceivers. Multiband, multimode selector 125-1 may also consider the state and/or capacity pertaining to other communicative components, such as, for example, modulators, demodulators, multiplexers, de-multiplexers, filters, amplifiers, etc.

Figure 1D:
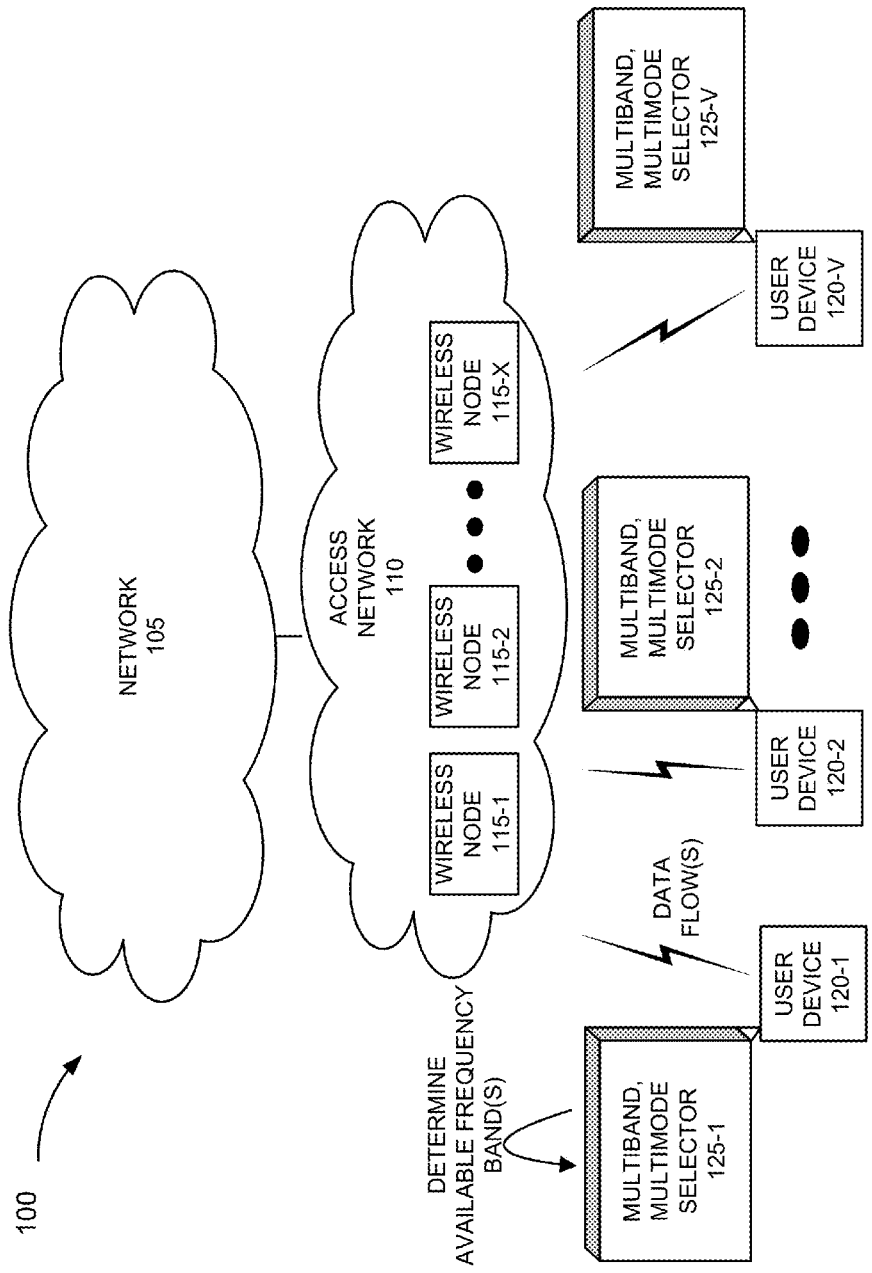
Figure 1E:
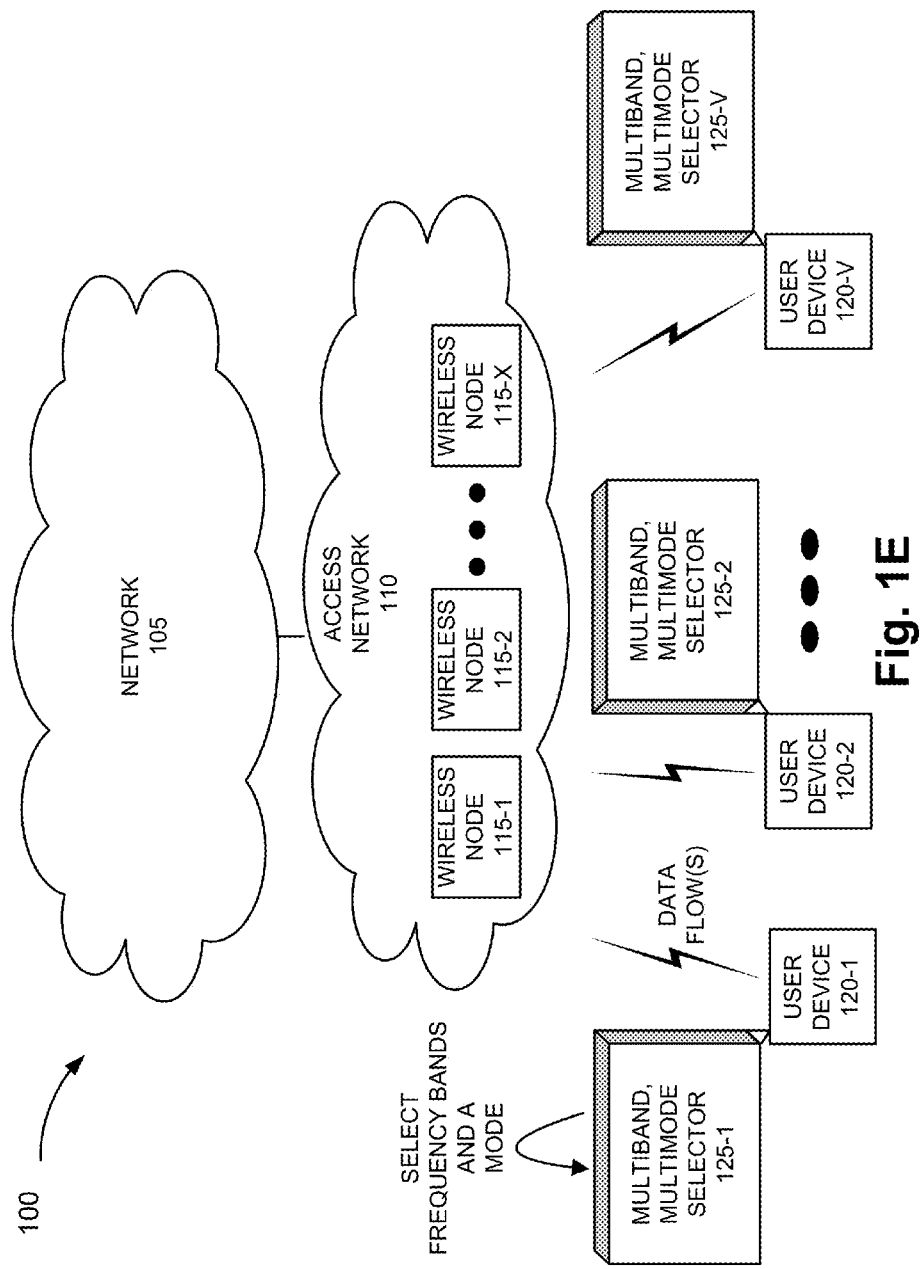
Figure 1F:
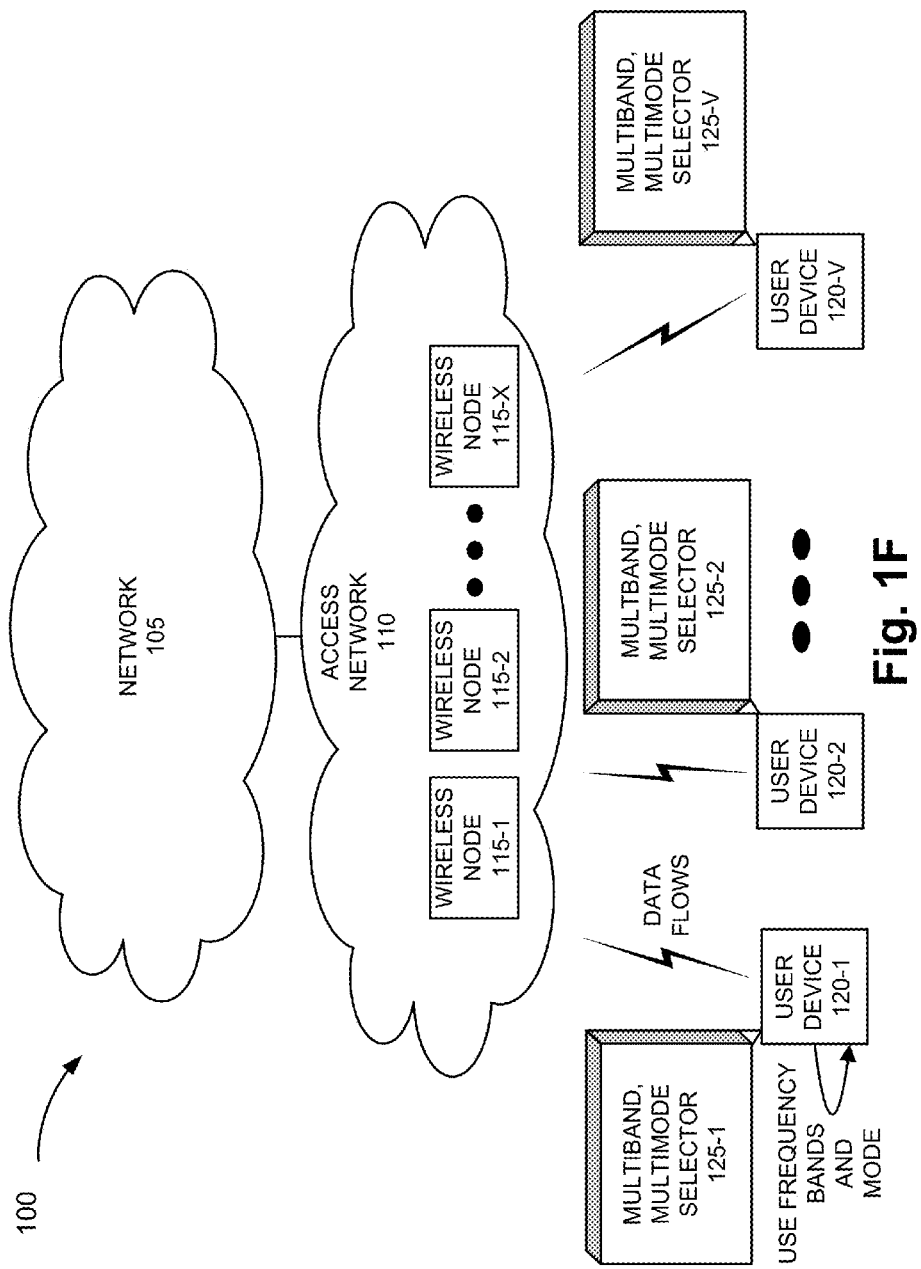

Referring to FIG. 1D, multiband, multimode selector 125-1 may determine what channel(s) and/or frequency band(s) are available to accommodate the request. For example, user device 120-1 may send one or more resource requests to access network 110. For example, user device 120-1 may simultaneously connect to one or multiple wireless nodes 115. In this example, multiband, multimode selector 125-1 determines that multiple frequency bands of the same mode may be used. As illustrated in FIG. 1E, multiband, multimode selector 125-1 may select multiple frequency bands and a single mode to accommodate the request. Referring to FIG.

1F, user device 120-1 may operate using the selected frequency bands and mode for this request.

FIG. 2 is a diagram illustrating exemplary components of a device 200 that may correspond to one or more of the devices in environment 100. For example, device 200 may correspond to wireless node 115 and/or user device 120 depicted in FIGS. 1A-1F. As illustrated, device 200 may include a processing system 205, memory/storage 210 including applications 215, and a communication interface 220. According to other implementations, device 200 may include fewer components, additional components, different components, and/or a different arrangement of components than those illustrated in FIG. 2 and described herein. For example, device 200 may include input components (e.g., a touchscreen, a keyboard, a keypad, a microphone, an input port, etc.) and output components (e.g., a display, a speaker, an output port, etc.).

Processing system 205 may include one or multiple processors, microprocessors, data processors, co-processors, application specific integrated circuits (ASICs), controllers, programmable logic devices, chipsets, field programmable gate arrays (FPGAs), or some other component that may interpret and/or execute instructions and/or data. Processing system 205 may control the overall operation, or a portion of operation(s) performed by device 200. Processing system 205 may perform one or multiple operations based on an operating system and/or various applications (e.g., applications 215). Processing system 205 may access instructions from memory/storage 210, from other components of device 200, and/or from a source external to device 200 (e.g., another device, a network, etc.).

Memory/storage 210 may include one or multiple memories and/or one or multiple secondary storages. For example, memory/storage 210 may include a random access memory (RAM), a dynamic random access memory (DRAM), a read only memory (ROM), a programmable read only memory (PROM), a flash memory, and/or some other type of storing medium (e.g., a computer-readable medium, a compact disk (CD), a digital versatile disk (DVD), a Blu-Ray disk (BD), or the like). Memory/storage 210 may include a hard disk (e.g., a magnetic disk, an optical disk, a magneto-optic disk, a solid state disk, etc.) or some other type of medium, along with a corresponding drive. Memory/storage 210 may be external to and/or removable from device 200, such as, for example, a Universal Serial Bus (USB) memory stick, a dongle, a hard disk, mass storage, off-line storage, or the like. Memory/storage 210 may store data, application(s), and/or instructions related to the operation of device 200.

The term "computer-readable medium," as used herein, is intended to be broadly interpreted to include, for example, a memory, a secondary storage, a CD, a DVD, a BD, or another type of tangible storage medium.

Applications 215 may include software that provides various services or functions. For example, with reference to user device 120, applications 215 may include a telephone application, a voice recognition application, a video application, a multi-media application, a music player application, a contacts application, a calendar application, an instant messaging application, a web browsing application, a location-based application (e.g., a Global Positioning System (GPS)-based application, etc.), a blogging application, and/or other types of applications (e.g., a word processing application, a facial expression/recognition application, etc.). Applications 215 may also include an application that performs one or more function(s) or process(es) pertaining to multi-channel, multiband, multimode selection, as described herein.

Communication interface 220 may permit device 200 to communicate with other devices, networks, systems and/or the like. Communication interface 220 may include one or multiple wireless interface(s) and/or wired interface(s). For example, with reference to user device 120, communication interface 220 may include multiple transmitters and receivers, or multiple transceivers, which are capable of operating in multiple modes. Communication interface 220 may also include other types of communicative components, such as, for example, modulators, demodulators, multiplexers, de-multiplexers, filters, amplifiers, equalizers, and/or forward error correctors.

Device 200 may perform operations in response to processing system 205 executing software instructions stored by memory/storage 210. For example, the software instructions may be read into memory/storage 210 from another memory/storage 210 or from another device via communication interface 220. The software instructions stored in memory/storage 210 may cause processing system 205 to perform processes described herein. Alternatively, according to another implementation, device 200 may perform processes based on the execution of hardware (e.g., processing system 205, etc.), the execution of hardware and firmware, or the execution of hardware, software (e.g., applications 215), and firmware.

As previously described, multiband, multimode selector 125 may select one or more frequency bands and one or more modes, which user device 120 may operate, to service a user's request and/or communication with respect to other devices, networks, systems, etc. Additionally, as previously described, multiband, multimode selector 125 may select channels and frequency bands associated with different wireless network operators (e.g., network operator A and network operator B).

Figure 3A:
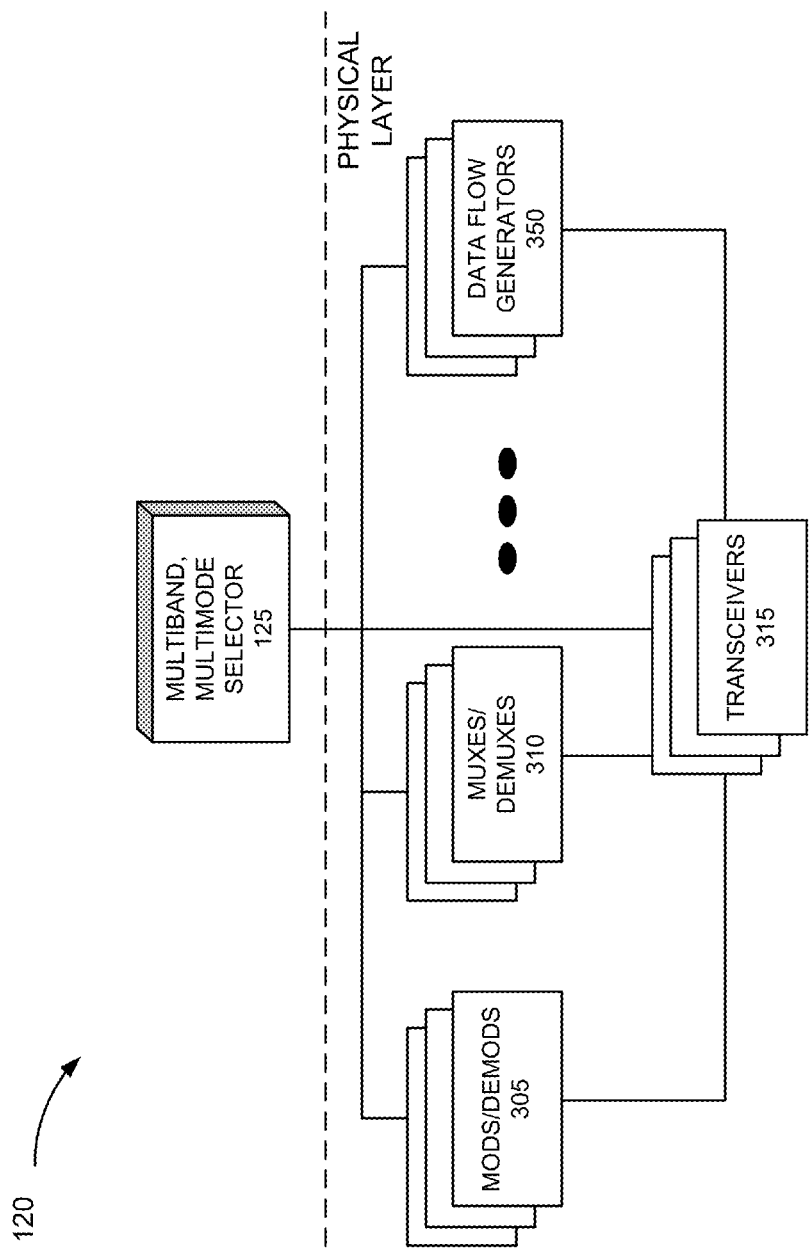

Multiband, multimode selector 125 may control various communicative components, e.g., at the physical layer, included in user device 120, as these components pertain to the selection and simultaneous use of channel(s), frequency band(s) and mode(s). By way of example, as illustrated in FIG. 3A, various communicative components may include modulators/demodulators 305, multiplexers/de-multiplexers 310, transceivers 315, and data flow generators 350. Multiband, multimode selector 125 may control other communicative components (not illustrated in FIG. 3A), such as, for example, filters, amplifiers, equalizers, error correction, and/or other components that may be used by user device 120 to wirelessly communicate.

Figure 3B:
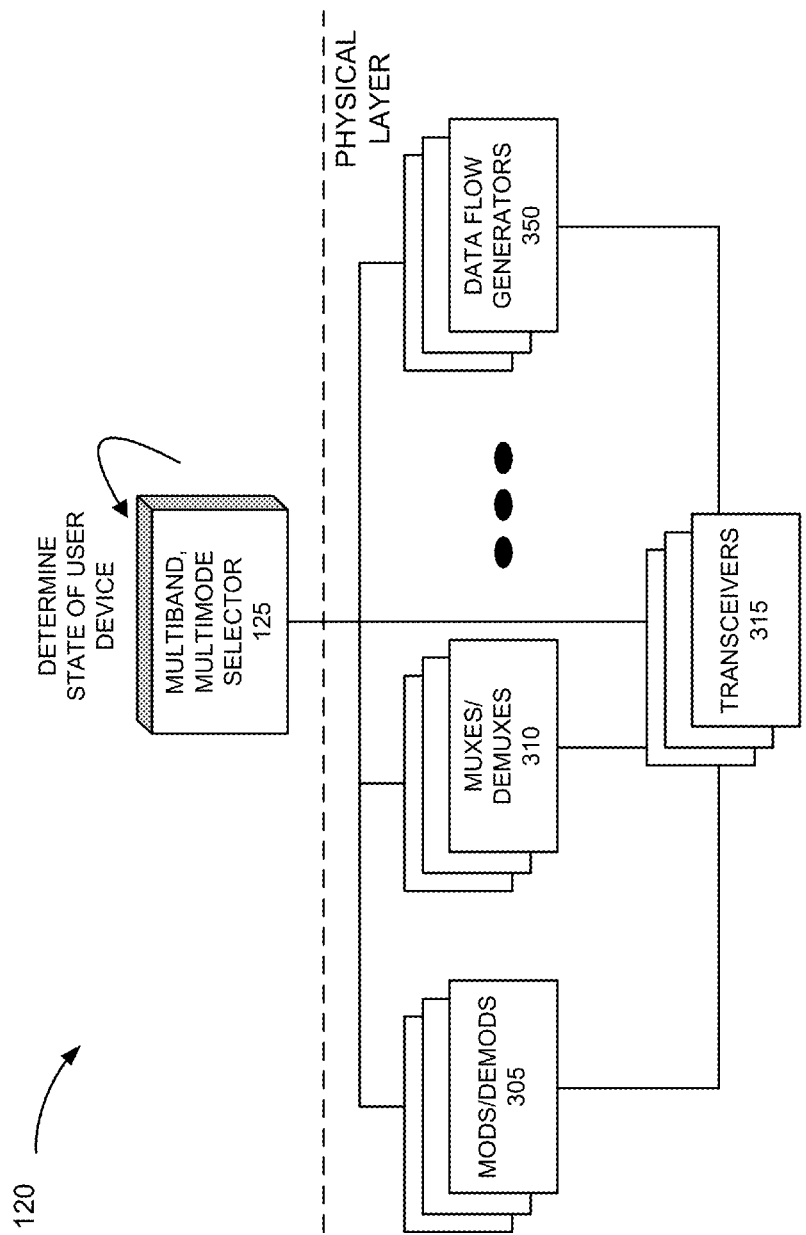

As previously described, according to an exemplary embodiment, multiband, multimode selector 125 may determine the state of various communicative components, as illustrated in FIG. 3B. For example, multiband, multimode selector 125 may determine whether other requests are being serviced and to what capacity these other requests are utilizing the resources offered by the communicative components. Additionally, multiband, multimode selector 125 may recognize what channels, frequency bands and modes are still available and what capacity is still available in view of the current use of the communicative components. As an example, one or more transceivers 315 may be used for LTE communications, while other transceivers 315 may be used for GSM, UMTS, CDMA, etc., communications.

Additionally, as previously described, depending on the request, multiband, multimode selector 125 may distribute the load associated with a request, as illustrated in FIG. 3C. For example, multiband, multimode selector 125 may select multiple channels and/or multiple frequency bands and a single mode or multiple channels and/or multiple frequency bands and multiple modes of communication to service the request. According to an exemplary embodiment, multiband, multimode selector 125 may consider demand information pertaining to the request, as well as the state of various communicative components, as previously described. Additionally, multiband, multimode selector 125 may consider the network resources available (e.g., in terms of wireless node(s) 115, frequency band(s), communication standard(s), etc.). User device 120 may make one or multiple resource requests to access network 110 to determine network resource availability. According to an exemplary embodiment, multiband, multimode selector 125 may use load balancing to distribute the load across the multiple frequency bands and mode(s) in view the resources available, state of user device 120, etc. According to another exemplary embodiment, multiband, multimode selector 125 may not use load balancing (e.g., an uneven distribution among frequency bands, etc.).

Multiband, multimode selector 125 may select and cause to be used the channels, frequency bands and mode(s) selected, as illustrated in FIG. 3D. For example, multiband, multimode selector 125 may provide configuration information to allow the communicative components to service the request. The configuration information may include the frequency bands to be used and the mode(s) to be used.

Figure 4A:
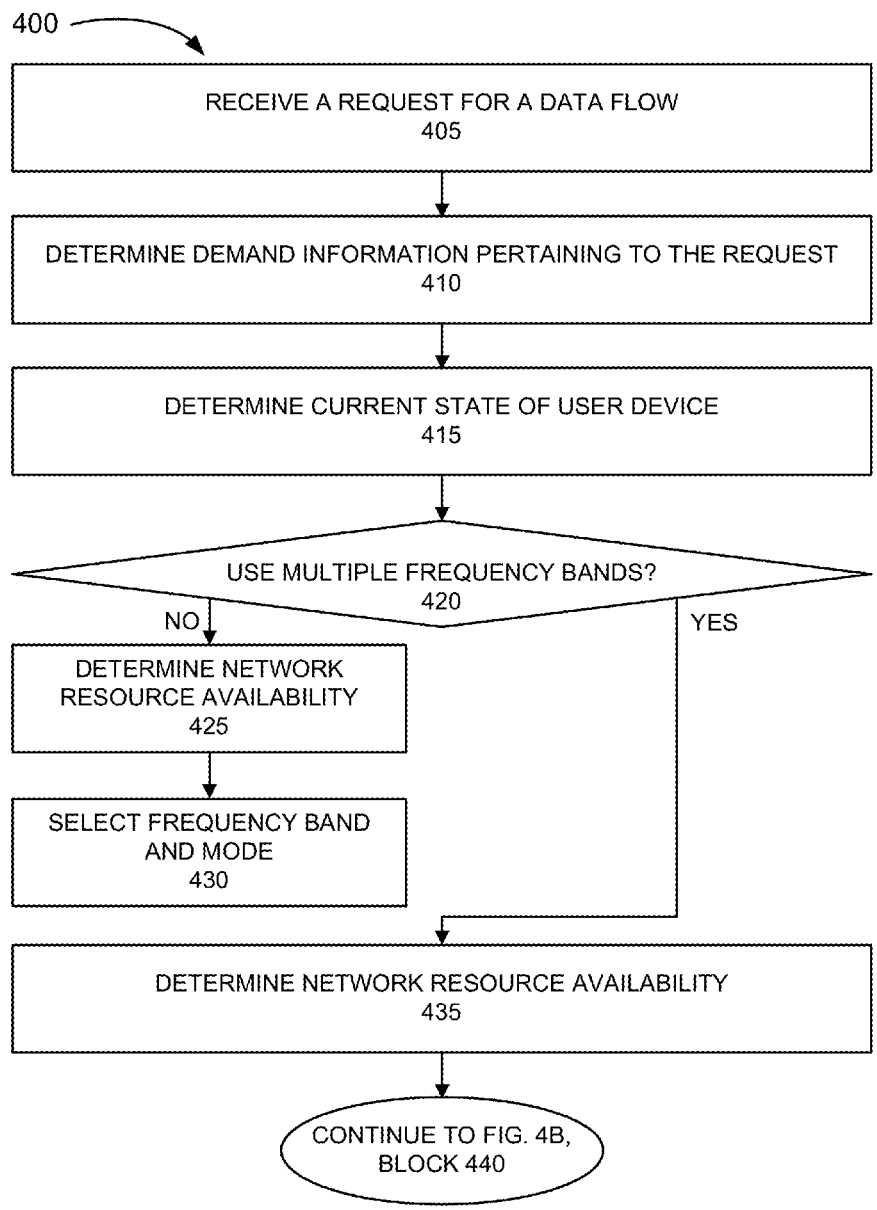
FIGS. 4A and 4B are flowcharts illustrating an exemplary process for multiband, multimode selection and simultaneous use.
Figure 4B:
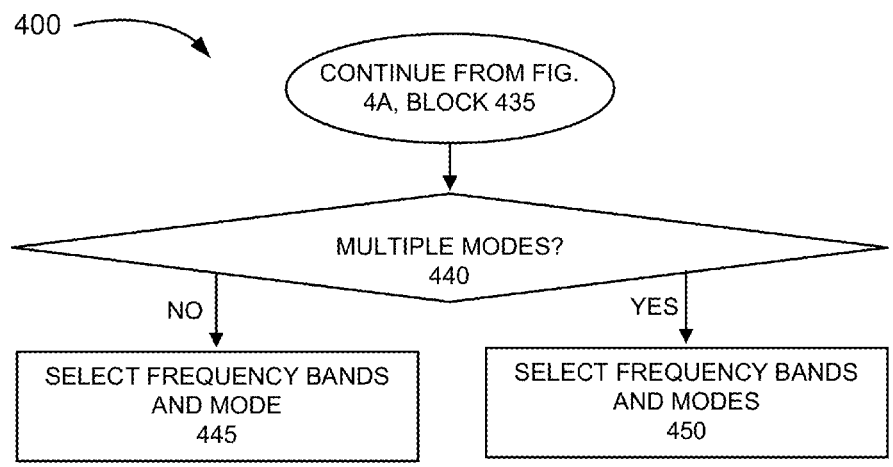

FIGS. 4A and 4B are flowcharts illustrating an exemplary process 400 for multiband, multimode selection and use. According to an exemplary embodiment, one or more operations of process 400 may be performed by multiband, multimode selector 125.

Process 400 may include receiving a request (block 405). For example, as previously described, user device 120 may receive a user's request (e.g., via an application) or a request from another user device, from a network device (e.g., wireless node 115, an application server, or some other resource device), etc., relating to a data flow. For example, the data flow may include receiving or transmitting data by user device 120.

Demand information pertaining to the request may be determined (block 410). For example, as previously described, user device 120 (e.g., multiband, multimode selector 125) may receive demand information pertaining to the request. By way of example, the demand information may include a file size, a bandwidth, a data rate, a data rate range, a bandwidth range, and/or a level of service (e.g., QoS).

The current state of the user device may be determined (block 415). For example, as previously described, user device 120 (e.g., multiband, multimode selector 125) may determine whether other requests are being serviced and to what capacity these other requests are utilizing the resources offered by the communicative components. Additionally, multiband, multimode selector 125 may recognize what channels, frequency bands and modes are still available, based on the capabilities associated with the communicative components, and what capacity is still available in view of the current usage.

It may be determined whether multiple frequency bands may be needed (block 420). For example, as previously described, user device 120 (e.g., multiband, multimode selector 125) may determine whether multiple channels and/or multiple frequency bands may be needed based on the demand information and/or current state of user device 120. For example, the demand information may indicate a load to exceed the capacity of a single channel and/or a single frequency band and/or the current state of user device 120 may require use of multiple frequency bands. Additionally, or alternatively, multiband, multimode selector 125 may determine that multiple channels and/or multiple frequency bands may be needed based on the network resources available (as determined in blocks 425 and 435).

If it is determined that multiple frequency bands may not be needed (block 420—NO), network resource availability may be determined (block 425). For example, as previously described, user device 120 may determine network resource availability based on resource requests to access network 110 (e.g., wireless node(s) 115). The resource request(s) may be made to a wireless network operator A, a wireless network operator B, a wireless network operator C, etc.

A frequency band and a mode may be selected (block 430). For example, as previously described, user device 120 (e.g., multiband, multimode selector 125) may select the channel, frequency band and the mode to service the request. According to an exemplary embodiment, multiband, multimode selector 125 may determine whether the user's primary wireless network operator (e.g., wireless network operator A) may service the request. Multiband, multimode selector 125 may also consider other factors, such as, cost, level of service subscribed to by the user, channel quality indicators (CQIs), mobility of the user, existing wireless connections, etc. According to such an embodiment, multiband, multimode selector 125 may select a non-primary wireless network operator (e.g., wireless network operator B) when the user's primary wireless network operator has insufficient network resources to satisfy the request. According to other embodiments, multiband, multimode selector 125 may not give the user's primary wireless network operator preference. Multiband, multimode selector 125 may provide configuration information to communicative components of user device 120.

Referring back to block 420, if it is determined that multiple frequency bands may be needed (block 420—YES), network resource availability may be determined (block 435). For example, as previously described, user device 120 may determine network resource availability based on resource requests to access network 110 (e.g., wireless node(s) 115). The resource request(s) may be made to a wireless network operator A, a wireless network operator B, a wireless network operator C, etc.

Referring to FIG. 4B, it may be determined whether multiple modes may be needed (block 440). For example, as previously described, user device 120 (e.g., multiband, multimode selector 125) may determine whether multiple modes may be needed. According to an exemplary embodiment, multiband, multimode selector 125 may make such a determination based on the network resources available and the current state of user device 120.

If it is determined that multiple modes may not be needed (block 440—NO), frequency bands and a mode may be selected (block 445). For example, as previously described, user device 120 (e.g., multiband, multimode selector 125) may select multiple channels and/or multiple frequency bands and a single mode to distribute the load associated with the request across the selected multiple frequency bands using a single mode of communication. Multiband, multimode selector 125 may provide configuration information to the communicative components in correspondence to the selected multiple frequency bands and mode. User device 120 may operate according to the selected frequency bands and mode.

If it is determined that multiple modes may be needed (block 440—YES), frequency bands and multiple modes may be selected (block 450). For example, as previously described, user device 120 (e.g., multiband, multimode selector 125) may select multiple channels and/or multiple frequency bands and multiple modes to distribute the load associated with the request across the selected multiple frequency bands using multiple modes of communication. Multiband, multimode selector 125 may provide configuration information to the communicative components in correspondence to the selected multiple channels, frequency bands and modes. User device 120 may operate according to the selected channels, frequency bands and modes.

Although FIGS. 4A and 4B illustrate an exemplary process 400 for providing multiband, multimode selection and use, according to other implementations, process 400 may include additional operations, fewer operations, and/or different operations than those illustrated in FIGS. 4A and 4B and described herein. For example, process 400 may include operations that depend on existing wireless connections and/or data flows, the load of the received request, the network resources available, the current state of user device 120, the capabilities of user device 120 with respect to frequency bands and modes, as well as other factors (e.g., cost to user, level of subscription, etc.).

In one example, as discussed above, device 120 may receive a request to download a large file (e.g., one terabyte) for its user (block 405). Selector 125 may determine that the request for a one-terabyte file is large (block 410) but that user device 120 can handle the request (block 415) by using two frequency bands (block 420—YES) and two modes (block 440—YES). User device 120 polls access network 110 (block 435) and determines that the download is possible using two carriers: e.g., on a first frequency band using CDMA-2000 and on a second frequency band using LTE. This connection information may be shared with access network 110. In this example, when access network 110 receives data corresponding to the one-terabyte file, access network 110 may distribute or load-balance the data across the two different carriers (e.g., one carrier or interface on a first frequency band using CDMA-2000 and a second carrier or interface on a second frequency band using LTE.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks are described with regard to the processes illustrated in FIGS. 4A and 4B, the order of the blocks may be modified in other implementations. Further, non-dependent blocks may be performed in parallel. Additionally, with respect to other processes described in this description, the order of operations may be different according to other implementations, and/or operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processing system 205, etc.), a combination of hardware and software (e.g., applications 215), a combination of hardware and firmware, or a combination of hardware, software, and firmware. The implementation of software or firmware has been described without reference to the specific software code since software can be designed to implement the embodiments based on the description herein. Additionally, a computer-readable medium may store instructions, which when executed, may perform processes and/or functions pertaining to the exemplary embodiments described herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, operation, or instruction described in the present application should be construed as critical or essential to the embodiments described herein unless explicitly described as such.

What is claimed is:

1. A method comprising:
   receiving, by a multiband, multimode user device, a request pertaining to a data flow within a wireless network;
   determining, by the multiband, multimode user device, a state of the multiband, multimode user device;
   selecting, by the multiband, multimode user device:
      at least one of multiple channels or multiple frequency bands and a single mode, or
      the at least one of multiple channels or multiple frequency bands and multiple modes to satisfy the request based on the state of the multiband, multimode user device; and
   initiating, by the multiband, multimode user device, the data flow in the wireless network using the selected at least one of multiple channels or multiple frequency bands and the single mode, or the selected at least one of multiple channels or multiple frequency bands and the multiple modes to satisfy the request.

2. The method of claim 1, further comprising:
   determining one or more network resources, of a plurality of network resources associated with the network, that are available to satisfy the request,
   wherein selecting the at least one of multiple channels or multiple frequency bands and a single mode, or the at least one of multiple channels or multiple frequency bands and multiple modes is further based on the determined one or more network resources.

3. The method of claim 1, further comprising:
   determining a load associated with satisfying the request,
   wherein selecting the at least one of multiple channels or multiple frequency bands and a single mode, or the at least one of multiple channels or multiple frequency bands and multiple modes is further based on the load.

4. The method of claim 3, wherein initiating the data flow includes:
   load balancing the load across the selected at least one of multiple channels or multiple frequency bands and across the single mode or the multiple modes.

5. The method of claim 3, wherein the load includes at least one of:
   a file size associated with the load satisfying the request,
   a bandwidth associated with satisfying the request,
   a data rate associated with satisfying the request,
   a latency associated with satisfying the request,
   a data rate range associated with satisfying the request,
   a bandwidth range associated with satisfying the request, or
   a level of service associated with satisfying the request, and
   wherein selecting the at least one of multiple channels or multiple frequency bands and a single mode, or the at least one of multiple channels or multiple frequency bands and multiple modes is further based on the at least one of the file size, the bandwidth, the data rate, the latency, the data rate range, the bandwidth range, or the level of service.

6. The method of claim 1, wherein the multiple channels or the multiple frequency bands are associated with different wireless network operators.

7. The method of claim 1, wherein determining the state of the multiband, multimode user device comprises:
   determining a state pertaining to transmitters and receivers or transceivers associated with the multiband, multimode user device,
   wherein selecting the at least one of multiple channels or multiple frequency bands and a single mode, or the at least one of multiple channels or multiple frequency bands and multiple modes is further based on the state pertaining to the transmitters and the receivers or the transceivers.

8. The method of claim 1, further comprising:
   identifying that a load pertaining to the request exceeds a capacity of a single channel or a single frequency band,
   wherein selecting the at least one of multiple channels or multiple frequency bands and a single mode, or the at least one of multiple channels or multiple frequency bands and multiple modes is further based on identifying that the load pertaining to the request exceeds the capacity.

9. A user device comprising:
   a processing system configured to:
      receive a request pertaining to a data flow;
      determine a communicative state of the user device; and
      select at least one of multiple channels or multiple frequency bands and a single mode, or at least one of multiple channels or multiple frequency bands and multiple modes to satisfy the request; and
   multiple transceivers or multiple transmitters and receivers configured to:
      use the selected at least one of multiple channels or multiple frequency bands and the single mode, or the selected at least one of multiple channels or frequency bands and the multiple modes to satisfy the request via one or more wireless connections.

10. The user device of claim 9, wherein the processing system is further configured to:
    determine possible network resources that are available to satisfy the request when the request is received,
    wherein the processing system selects the at least one of multiple channels or multiple frequency bands and a single mode, or the at least one of multiple channels or multiple frequency bands and multiple modes to satisfy the request based on the determined possible resources.

11. The user device of claim 9, wherein the processing system is further configured to:
    determine a load associated with satisfying the request,
    wherein the processing system selects the at least one of multiple channels or multiple frequency bands and a single mode, or the at least one of multiple channels or multiple frequency bands and multiple modes to satisfy the request based on the determined load associated with satisfying the request.

12. The user device of claim 11, wherein the processing system is further configured to:
    load-balance the load of the request:
       across the multiple transceivers or the multiple transmitters and receivers,
       across the selected at least one of multiple channels or multiple frequency bands, and
       across the single mode or the multiple modes.

13. The user device of claim 9, wherein the multiple channels or the multiple frequency bands are associated with different wireless network operators.

14. The user device of claim 9, wherein the processing system selects that at least one of multiple channels or multiple frequency bands based on at least one of:
    network resources available when the request is received,
    the communicative state of the user device, or
    a load associated with the request.

15. The user device of claim 9, wherein the processing system is further configured to:
    determine a utilization of user device resources pertaining to one or more other requests,
    wherein the processing system selects the at least one of multiple channels or multiple frequency bands and a single mode, or the at least one of multiple channels or multiple frequency bands and multiple modes to satisfy the request based on the utilization of the user device resources pertaining to the one or more other requests.

16. The user device of claim 9, wherein the user device includes a mobile device associated with a wireless network using the multiple channels or the multiple frequency bands.

17. A non-transitory computer-readable medium storing instructions, the instructions comprising:
    one or more instructions that, when executed by a processor associated with a device, cause the device to:
       receive a request pertaining to a data flow to be received by a multiband, multimode device via a network that operates on multiple channels or multiple frequency bands and in multiple modes;
       determine a state of the multiband, multimode device;
       select at least one of the multiple channels or the multiple frequency bands and at least one of the multiple modes to satisfy the request based on the determined state of the multiband, multimode device; and
       configure the multiband, multimode device to operate according to the selected at least one of the multiple channels or the multiple frequency bands and the selected at least one of the multiple modes.

18. The non-transitory computer-readable medium of claim 17, wherein the instructions further comprise:
    one or more instructions to:
       determine the at least one of the multiple channels or the multiple frequency bands to satisfy the request based on at least one of:
          network resources, associated with the network, that are available to the multiband, multimode device when the request is received, or
          a load associated with satisfying the request.

19. The non-transitory computer-readable medium of claim 17, wherein the one or more instructions to configure the multiband, multimode device further include:
    one or more instructions to:
       balance a load associated with the request across the selected at least one of multiple channels or multiple frequency bands and the selected at least one of the multiple modes.

20. The non-transitory computer-readable medium of claim 17, wherein the multiple channels or the multiple frequency bands are associated with different wireless network operators.

* * * * *